Aug. 28, 1962     I. JACOBS     3,050,871
QUESTION AND HIDDEN ANSWER DEVICE
Filed Jan. 30, 1961     2 Sheets-Sheet 1
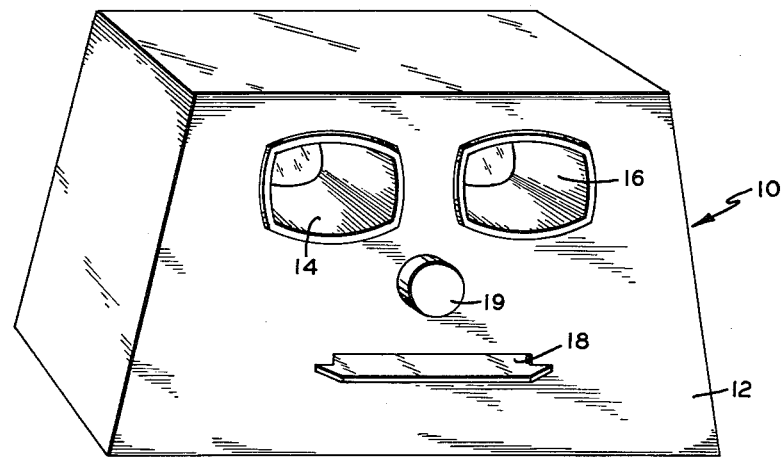
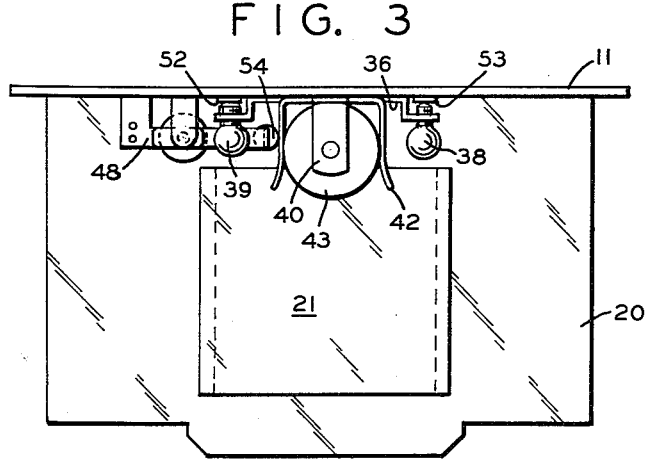
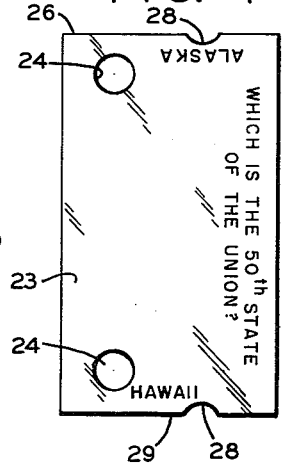
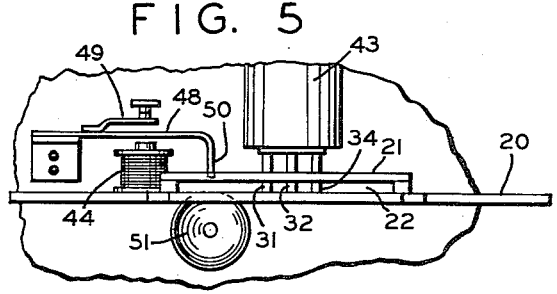
INVENTOR.
IRVING JACOBS
BY
HIS ATTORNEY.

Aug. 28, 1962     I. JACOBS     3,050,871

QUESTION AND HIDDEN ANSWER DEVICE

Filed Jan. 30, 1961     2 Sheets-Sheet 2

INVENTOR.
IRVING JACOBS

BY *John P. Chandler*

HIS ATTORNEY.

United States Patent Office 3,050,871
Patented Aug. 28, 1962

3,050,871
QUESTION AND HIDDEN ANSWER DEVICE
Irving Jacobs, New York, N.Y., assignor to
Edward Jacobs, New York, N.Y.
Filed Jan. 30, 1961, Ser. No. 85,729
4 Claims. (Cl. 35—9)

This invention relates to question and hidden-answer devices and relates more particularly to a novel apparatus employing a series of punched card with questions thereon and the operator selects the proper answer by inserting one end or the other of the card into the machine and if the question has been answered correctly the machine gives one response and if incorrect it gives a different response, usually in the form of a differently colored light and the emission of a different audible signal.

An important object of the invention is to provide a novel apparatus of this kind wherein the difference in audible sound is effected by employing the card as an interponent between a bell and an armature actuated by an electro-magnet. Then, if the question has been correctly answered a hole in the card is aligned with the path of travel of the striking end of the armature during its motion toward and away from the magnet. This allows the armature to make direct contact with the bell, while if the card has been otherwise inserted, so as to indicate an incorrect answer, the armature strikes the card rather than the bell, issuing a somewhat muffled note of a non-musical character.

This novel arrangement provides an interesting and instructive device with fewer parts than would otherwise be the case and thus reduces the cost to the consuming public.

In the drawings:

FIG. 1 is a perspective view of an embodiment of the present invention.

FIG. 3 is a plan view showing the internal operating parts.

FIG. 4 is a plan view of a punched card used in the apparatus of the present invention.

FIG. 5 is a broken front elevation of the instrument panel.

Figure 6:
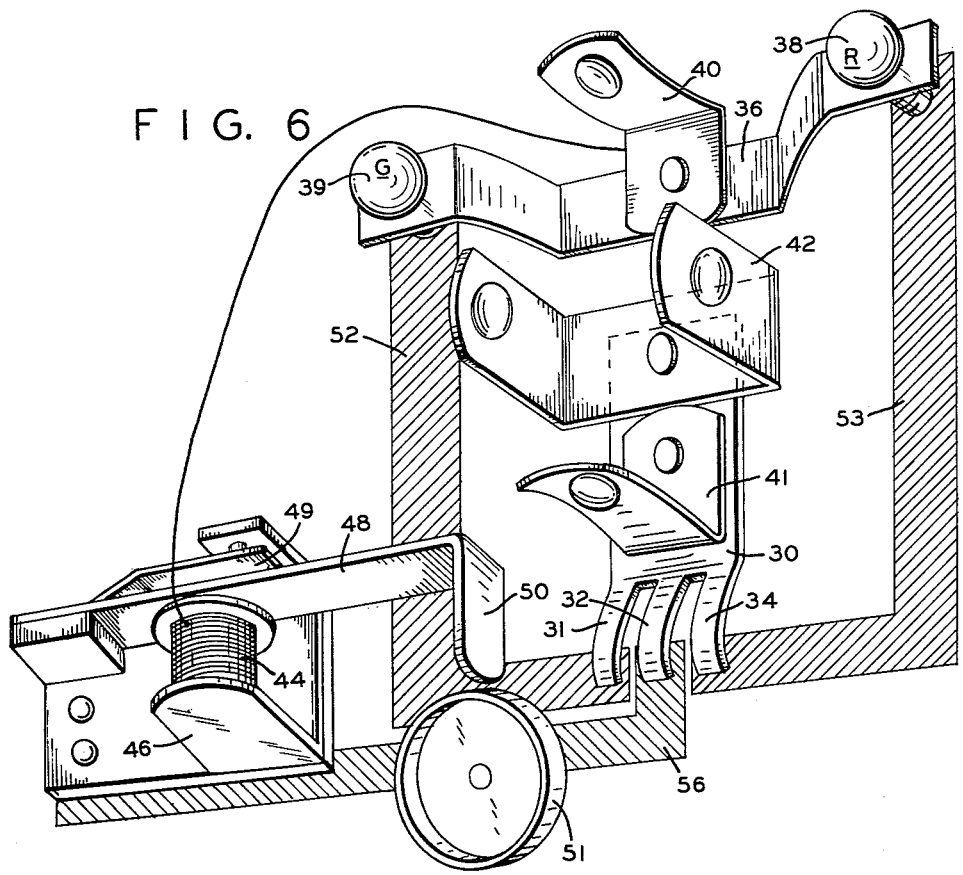
FIG. 6 is a perspective view of the operating components.
Figure 2:
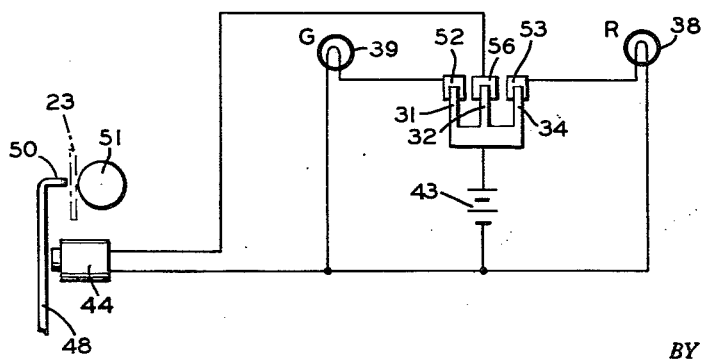
FIG. 2 is a circuit diagram.

The apparatus of the present invention includes a housing 10 with a rear wall or frame 11 on which the operative parts are mounted. The housing further includes a front wall 12 having openings 14 and 16 simulating human eyes, and an opening 18 for the introduction of the punched card, which opening may simulate a human mouth. It may also have a simulated nose 19.

A horizontal panel 20 has a portion extending through opening 18 and said panel also has a raised central wall section 21 forming a slot 22 to receive the card, the slot being aligned with front wall opening 18. The card 23 is shown with a hole or void 24 adjacent leading edge 26 thereof and said leading edge also has a second void formed as a cut-out 28 on the side opposite the hole 24. The edge 29 opposite leading edge 26 has a similar but oppositely disposed arrangement. The leading edge of the card, on being pushed fully in, engages a normally open switch 30 formed of sheet metal and having three movable contacts 31, 32 and 34 which are urged rearwardly. This switch is mounted on rear wall 11 and on this wall there is also an angular metallic bracket 36 having holes to receive supporting sockets for differently colored lights 38 and 39. Thus if light 38 is red it will be used to indicate an incorrect answer while a green light 39 indicates a correct answer. Also supported on this rear wall are upper and lower contact brackets 40 and 41 for a battery 43. This battery is also supported between the walls of a U-shaped bracket 42.

The sounding element indicating a correct or an incorrect answer is a bell arrangement having an electro-magnet 44 mounted in a frame 46 and having an armature 48 with the usual make and break contact 49 effective during its motion toward and away from the magnet, and also having a downturned end 50 which engages a bell 51. The panel 20 has an opening 54 through which the striking end projects. The rear wall may have a printed circuit including L-shaped elements 52 and 53 connected with lights 39 and 38 and underlying switch contacts 31 and 34. Another element 56 connects contact 32 with one end of the magnet winding, while the other end 52 is connected with bracket 36 which also forms one pole of the light circuit.

The card will have indicia printed thereon, such as a question having a "yes" or "no" answer. If the card is inserted into the slot 22 in the position it occupies in FIG. 4, it will be assumed that the question is correctly answered, whereas if the opposite edge 29 is inserted first, it will be assumed that the answer is incorrect. Thus, if the edge 26 is the leading edge, it engages spring contacts 31 and 32 and closes them, while the edges of the cut-out 28 engage nothing and thus fails to close contact 33. The circuit may then be traced from the battery, through light 39, through conductor element 52 and contact 31 and back to the battery. Also, from the battery, through electromagnet winding 44, through conductor element 56 and contact 32 and back to the battery. This illuminates the green bulb and permits the armature extension 50 to strike bell 51 during vibration since the parts are arranged so that card opening 24 is aligned with the striking end of the armature. If, however, edge 29 of the card is first inserted, the green light circuit remains open due to the presence of cut-out 28 opposite spring contact 31, and also lights red light 38 due to closing of contacts 34 and conductor element 53. Also, opening 24 on the card is on the opposite side and hence the card is interposed between the armature and the bell. The sound thus emitted is a dull, non-musical note, clearly distinguishable from the other.

The printed indicia shown on the card in FIG. 4 includes a question "Which is the 50th State of the Union?". The word "Hawaii," which is the correct answer, is printed along the trailing edge 29 of the card and the wrong answer, "Alaska" is printed along the leading edge 26. If this leading edge 26 is moved in forwardly the void 28 will not contact switch element 34 but the remaining edge sections will close switches 31 and 32, thus closing the green light circuit and the buzzer circuit. In this position the hole 24 adjacent the edge 26 will lie in the area between the armature and the bell permitting the latter to be struck directly by the armature. If, however, the opposite edge 29 is inserted first the void 28 will not cause closure of switch 31 but switches 32 and 34 will close, lighting the red light and actuating the buzzer. The inserted card prevents the armature from striking the bell directly, thus causing a muffled sound indicating, together with the red light, the wrong answer.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A question and answer apparatus employing electrical circuits and punched cards for closing the circuits and comprising: a frame having a slot to receive the card, a normally open switch with a plurality of interconnected spring contact fingers arranged to be closed upon contact with the leading edge of the inserted card, an electric buzzer provided with an armature and a bell, the card being inserted into the frame between the armature and the bell, said card having a void to permit one of said circuits to remain open upon insertion of the card, the card also having a void located in the area of the inserted card lying between the armature and the bell to permit the armature to strike the bell when inserted in one position and to shield the bell when in another position.

2. A question and answer apparatus employing electrical circuits and punched cards for closing the circuits and comprising: a frame having a slot to receive the card, a normally open switch with a plurality of interconnected spring contact fingers arranged to be closed upon contact with the leading edge of the inserted card, an electric buzzer provided with an armature and a bell, the first circuit including said buzzer, a source of electrical power and one of said spring contacts, the second and third circuits each including said source, a light, and another of said contacts, the card having a void so as to close only the second or the third contact upon closing of the first, the card also having a void so positioned as to permit the armature to strike the bell when the card is in one position and to shield the bell when in another position and thus produce a different audible tone.

3. A question and answer apparatus employing electrical circuits and punched cards for closing the circuits and comprising: a frame having a slot to receive the card, a normally open switch with a plurality of interconnected spring contact fingers arranged to be closed upon contact with the leading edge of the inserted card, an electric buzzer provided with an armature and a bell, the first circuit including said buzzer, a source of electrical power and one of said spring contacts, the second circuit including said source, a light and another of said contacts, and the third circuit including said source, a second light of different color from the first and a third one of said contacts, the card having a cut-out so as to close only the second or the third contact upon closing of the first, the card also having an opening so positioned as to permit the armature to strike the bell when the card is in one position and to shield the bell when in another position and thus produce a different audible tone.

4. A question and answer apparatus employing electrical circuits and a card to selectively close the circuits, a buzzer provided with an armature and a bell included in one of the circuits and arranged to receive the card between the armature and the bell when the card is in one position, thus shielding the bell, the card having a void so that in a different position said opening will be located in the area between the armature and the bell and produce a different toned effect, upon the card closing the buzzer circuit, from that obtained when an imperforate section of the card is interposed between the armature and the bell.

References Cited in the file of this patent
UNITED STATES PATENTS

| | | |
|---|---|---|
| 1,322,379 | Wade | Nov. 18, 1919 |
| 2,586,234 | Kopas | Feb. 19, 1952 |
| 2,720,038 | Clark | Oct. 11, 1955 |